United States Patent [19]
Edge

[11] Patent Number: 5,303,342
[45] Date of Patent: Apr. 12, 1994

[54] METHOD AND APPARATUS FOR ASSEMBLING A COMPOSITE IMAGE FROM A PLURALITY OF DATA TYPES

[75] Inventor: Christopher J. Edge, St. Paul, Minn.

[73] Assignee: Minnesota Mining and Manufacturing Company, St. Paul, Minn.

[21] Appl. No.: 64,362

[22] Filed: Dec. 22, 1992

Related U.S. Application Data

[63] Continuation of Ser. No. 553,175, Jul. 13, 1990, abandoned.

[51] Int. Cl.⁵ ............................................. G06F 15/00
[52] U.S. Cl. .................................... 395/164; 395/102; 395/115
[58] Field of Search .............................. 395/101-102, 395/109-110, 112, 114, 115-116, 150, 164-166; 358/451, 449, 462, 261.4, 528, 530, 540; 382/17, 19, 22, 41, 54; 355/266, 311

[56] References Cited

U.S. PATENT DOCUMENTS

| | | | |
|---|---|---|---|
| 4,084,183 | 4/1978 | Keller et al. ........................ | 395/164 |
| 4,419,690 | 12/1983 | Hammes ............................ | 395/164 |
| 4,419,691 | 12/1983 | Sing et al. ........................... | 395/164 |
| 4,456,924 | 6/1984 | Rosenfeld .......................... | 395/164 |
| 4,496,989 | 1/1985 | Hirosawa ........................... | 358/462 |
| 4,647,962 | 3/1987 | Rosen et al. ....................... | 395/164 |
| 4,729,037 | 3/1988 | Doelves ............................. | 395/164 |
| 4,849,822 | 7/1989 | Sing .................................... | 395/164 |
| 4,953,012 | 8/1990 | Abe .................................... | 358/462 |

OTHER PUBLICATIONS

ANSI Standard IT8. Jan.–1988.

*Primary Examiner*—Arthur G. Evans
*Attorney, Agent, or Firm*—Gary L. Griswold; Walter N. Kirn; William D. Bauer

[57] ABSTRACT

A method and apparatus for combining multiple image data files of differing sizes, resolutions, and formats in real time into a single data stream for conversion into halftone pixel data for printing by either single or multiple beam recording devices. The data of varying formats is received via a host interface which couples the data to a standard VME bus. The internal CPU reformats the data and stores it on disk memory. The data is routed by the CPU to one of a plurality of scan-line video processors which converts the data into halftone pixel data. The halftone data is routed to a single or multiple beam recording device for printing. A special low resolution image is prepared by the CPU for preview at a video work station.

3 Claims, 14 Drawing Sheets

METHOD AND APPARATUS FOR ASSEMBLING A COMPOSITE IMAGE FROM A PLURALITY OF DATA TYPES

This application is a continuation of application Ser. No. 07/553,175 filed Jul. 13, 1990, now abandoned.

BACKGROUND OF THE INVENTION

The present invention relates generally to high resolution graphic production, and more specifically, relates to real time data processing of multiple image data to produce a composite.

In reproduction technology, it is often desirable to combine multiple texts, photographic images, and geometric shapes into a single proof based upon layout information generated by some form of digital input. This input may be generated by a digital scanner or electronic work station which is used to create a montage. The layout information may have a variety of formats and protocols.

The majority of color separation films produced in the graphic arts industry currently are made using drum output recorders. Three data types (i.e., contone, contour, and run-length) are commonly used for storing and manipulating images that are converted to halftone pixels for output to these recorders.

The conversion process is typically preceded by a lengthy pre-processing step called a final page run, in which the three data types are converted into a common data format and the multiple images of the same data type are merged into one single file. Even though the resulting data stream defines a high-quality, high-resolution, four color separated image, the final page run unfortunately takes about an hour to complete. The commercially available Hell Chromacom 1000 system coupled to a DC 350 output recorder operates in this fashion.

Higher speed can be achieved in lower quality systems. These typically employ flatbed rather than drum recorders. Such systems tend to have fewer levels of grey in the halftone pixels, lesser precision in the output process, and greater susceptibility to moire patterns. Typical, commercially available systems of this type include the Hell LS-210 system and the Scitex Raystar system. Even though these systems sacrifice quality of output for enhanced speed, real time operation is seldom achieved because the output recorder must frequently pause in mid-image to permit the hardware to convert multiple image data types into halftone pixels.

U.S. Pat. No. 4,729,037, Doelves, is concerned with the production of printed material using image input from multiple sources. The system is designed for production of catalogs using high resolution data to be received from a scanner and relatively lower resolution data from a digital memory. To function in near real time, the system requires the data to be presented from the data sources synchronously.

A more flexible system is disclosed in U.S. Pat. No. 4,849,822, Sing. In this system, data may be added to an image from a digital work station. This permits text to be placed over high resolution images. To permit mixing of these images, however, the lower resolution inputs must be expanded and synchronously intermixed with the higher resolution input. Thus, the various components of the final proof cannot be stored in memory without an inordinate amount of hardware. The result is that the work station operator is limited in his ability to manipulate the data.

The Sing system is further limited in the types of data which can be processed automatically without operator supervision. High resolution compressed data, for example, must be expanded under direct operator control before it can be intermixed with other data types. High resolution contour data involving a color change within a pixel must be similarly processed by the operator before being combined.

U.S. Pat. No. 4,419,690, Hammes, shows a system which has a limited capacity to process input data of varying resolutions. A more flexible system is shown in U.S. Pat. No. 4,647,962, Rosen, et al. Though the system of Rosen, et al. provides for a greater range in the resolution of the input data, combining multiple images in the same proof is not provided without direct operator supervision.

Thus, these systems have limited capability to combine multiple images of varying resolution in real time to produce a composite.

SUMMARY OF THE INVENTION

The present invention overcomes the problems associated with the prior art systems by providing a technique for combining image, geometric, and textual data of differing formats and resolutions into a single composite proof. The combining process occurs in real time.

The image data files are received by a host interface in a variety of formats and placed on a standard bus from which they are transferred into system memory. Each data file is reformatted into one or more files and transferred to a data storage system under the control of a central processing unit. These transfer, reformatting, and storage procedures occur in parallel in real time at a data rate limited by the maximum data rate of the host system or by the data storage system, whichever is slower. The data is retrieved in accordance with a prepared map for transmission on the data bus to special purpose real time hardware conversion modules. The map is prepared in such a way as to optimize the speed of retrieving multiple image data files in parallel from the data storage system. The hardware conversion modules then convert the various data formats to halftone pixel data in real time for output to the recording device at data rates limited by the data storage device or by the recording device, whichever is slower.

While the image data files are being received, low resolution files may be prepared in parallel during the reformatting process for preview by the operator at the video terminal of a work station. These low resolution files may be held in a database for convenient retrieval of archived images at a later date.

BRIEF DESCRIPTION OF THE DRAWINGS

The advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
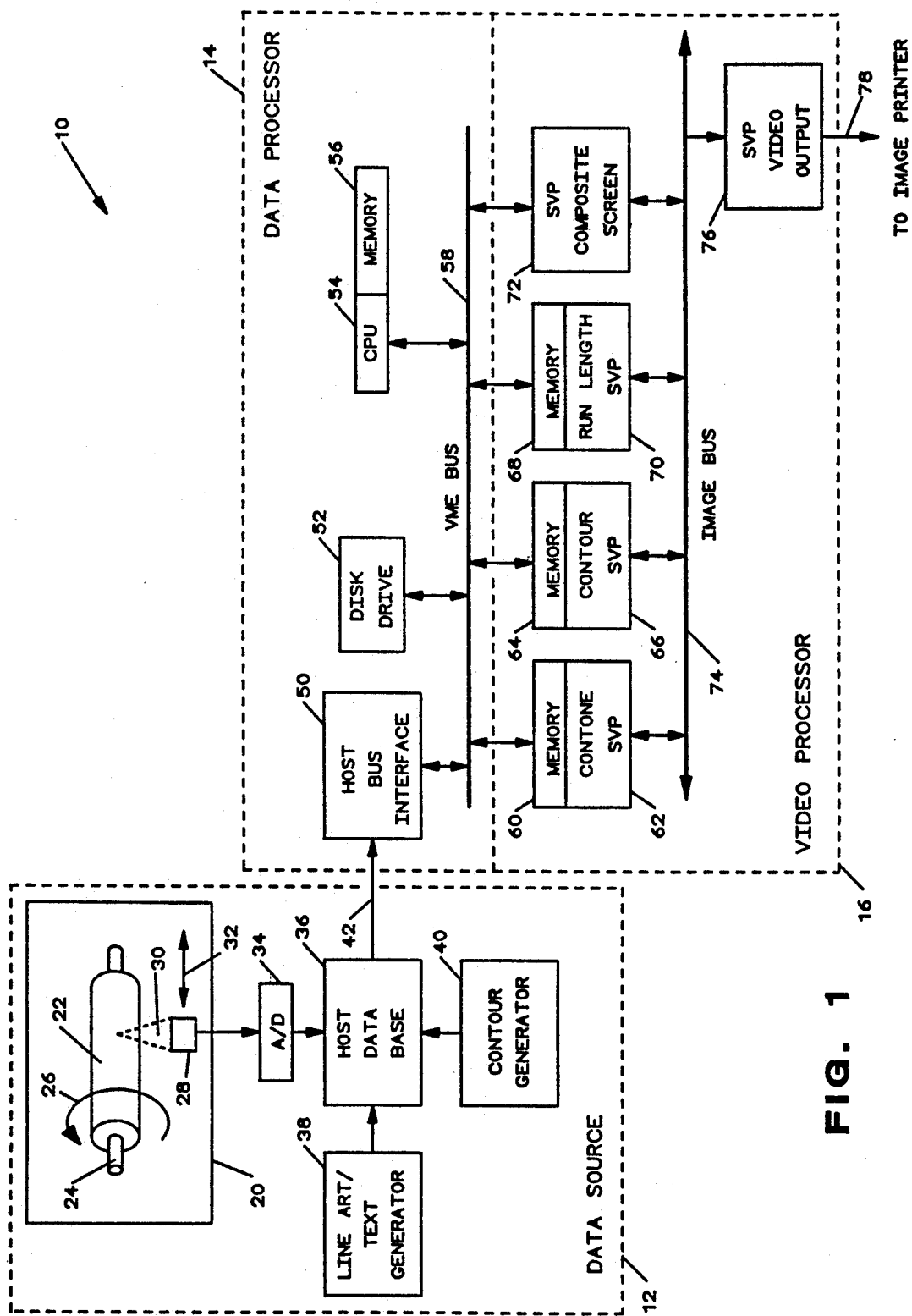
FIG. 1 is a block diagram of the complete graphics system including the input devices.

FIG. 1 is an overall block diagram of an image system 10 employing the present invention. The primary source of the image data is data source 12, which is shown in representative form. In the present example, data source 12 includes scanner drum 22, which rotates about axle 24 in the direction of arrow 26 to completely expose viewing area 30 of sensor 28 around the entire radius of an image placed on scanner drum 22. Complete longitudinal access is provided by movement of sensor 28 in the direction of arrow 32. The output of sensor 28 is digitized by analog-to-digital converter 34 and buffered in host data base 36. Other scanner devices may be included in data source 12 depending upon specific requirements.

Other image generators for data source 12 include Line Art/Text generator 38 and contour generator 40. The exact configuration of data source 12 may vary, and is not intended to limit the present invention. It may be constructed from components which are well known in the art.

Data from data source 12 is coupled to data processor 14 by cable 42. The data is coupled to the internal VME bus 58 of data processor 14 by host bus interface 50. It is important that host interface 50 be provided with direct memory access (DMA) capability so that excess CPU time is not consumed during high speed transfers of large blocks of data. The internal VME bus 58 hardware is readily available from MuPak, Inc. of Boston, Mass. Internal VME bus 58 provides the major data and control interface to the components within data processor 14 and to the major components of video processor 16.

The largest facility for storing image data within data processor 14 is disk drive 52. Though many configurations are possible, disk drive 52 is preferably of Winchester-compatible technology using commercially available hardware and interfaces. The method of segmentation and use of disk drive 52 is explained in detail below. It is important that disk drive 52 be provided with direct memory access (DMA) capability so that excess CPU time is not consumed during high speed transfers of large blocks of data.

Control of data processor 14 is provided by central processing unit 54 coupled to memory 56. Preferably these components are acquired from Ironics, Inc. of Ithica, N.Y. Memory 56 is 4 megabytes in the present configuration, although other combinations may also be appropriate. Software to control central processing unit 54 is discussed in detail below.

Video processor 16 is coupled to data processor 14 via internal VME bus 58. The purpose of video processor 16 is the real time conversion of image data presented in contone, contour, and run-line formats into halftone pixel information for transfer to the recording device. The operation of video processor 16 is briefly explained herein. Additional detail concerning video processing techniques is available in U.S. Pat. Nos. 4,729,037; 4,849,822; 4,419,690; 4,647,962; 4,084,183; and 4,456,924 all of which are incorporated herein by reference.

Contone DSP (digital signal processor) 62 receives contone data from data processor 14 via internal VME bus 58 and converts it in real time into high resolution pixel data. Similarly, contour DSP 66 converts contour data received into high resolution pixel data. Run-length DSP 68 converts run-length data into high resolution format. The interface to internal VME bus 58 is enhanced by memories 60, 64, and 68 which buffer the respective data for contone DSP 62, contour DSP 66, and run-length DSP 68.

Image bus 74 provides for the real time transfer of high resolution format data from the contone, contour, and run-length DSP's to the screen processor 72. The transfer of data from each board is enabled by the video output 76 according to the priority of input data type. The screen processor 72 receives the high resolution format data from the image bus and converts it to halftone binary pixel data. This halftone pixel data is then transferred via the image bus 74 to the video output 76 which transmits the halftone data to the output recorder (not shown) via high speed link 78 under the protocol used by the output recorder.

Figure 2:
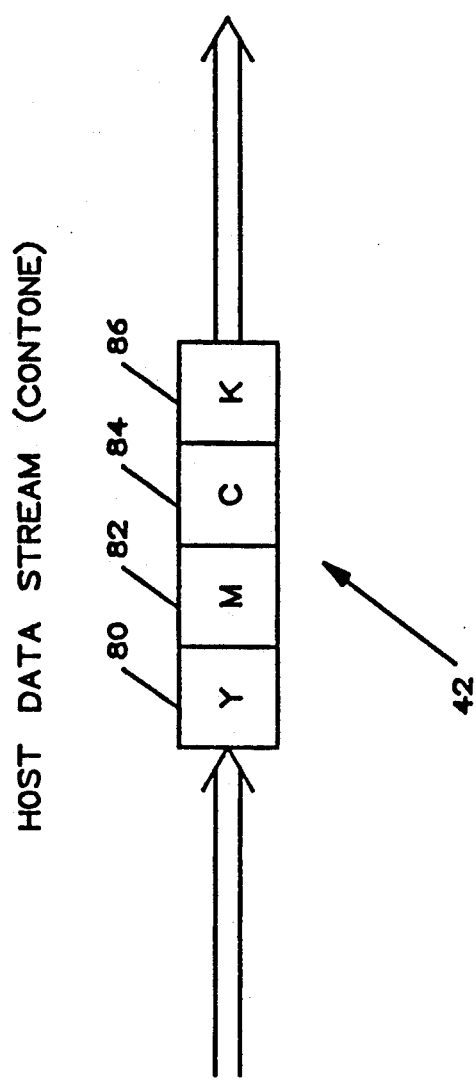
FIG. 2 is a schematic representation of contone data.

FIG. 2 is a schematic representation of one typical format of contone data. It is transferred from data source 12 to data processor 14 via cable 42 (see also FIG. 1). Contone data is that data normally used to represent a picture in relatively high resolution. It is typically produced by a scanner such as found in data source 12.

Contone data representing multiple color separations will most often be produced in pixel interleaved or line interleaved form. In the present example, Y 80 is a byte of data which represents the digital value of the yellow component at a point of the image. M 82 is the digital byte representing the magenta component of the same point. C 84 is a byte representing the cyan component. Similarly, K 86 is a byte representing the black or monochrome component of that very same point.

Some scanners will provide the color separated data interleaved by scan line. This data is processed in the same way except that deinterleaving by line rather than pixel is required (see below).

Figure 3:
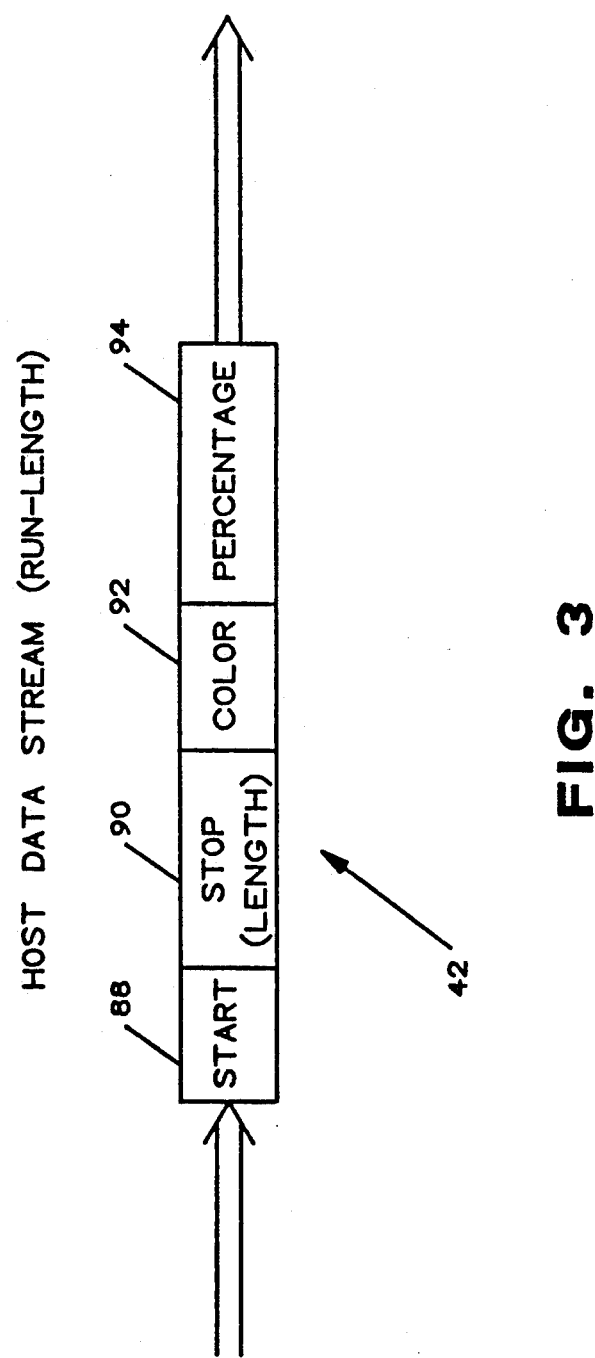
FIG. 3 is a schematic representation of run-length data.

FIG. 3 is a schematic representation of run-length data as transferred from data source 12 to data processor 14 via cable 42. Run-length is a format for compressing data which is of uniform color value for a reasonable portion of a scan line. Most often this format is useful for text and certain geometric representations. Instead of the same data being repeated pixel after pixel, the run-length data is provided only once for a large number of pixels, thereby reducing the overall data transfer and storage requirements.

Line Art/Text generator 38 would be a typical source of run-length data. A high resolution scanner may provide a similar data stream. Start 88 specifies the position along a scan line at which the run-length is to be initiated. Similarly, stop (length) 90 specifies the point at which the run-length stops. Alternatively, the length of the run may be specified in this field. Color 92 presents the specific color component being defined. Percentage 94 defines the amount of the color component present.

Figure 4:
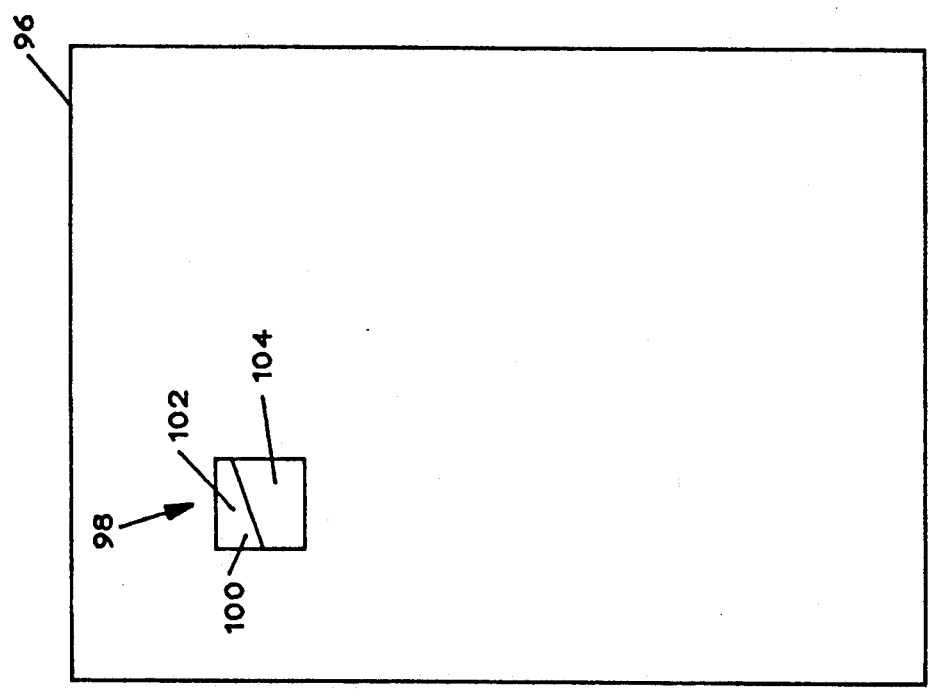
FIG. 4 is a schematic representation of the effect of contour data.

FIG. 4 is a schematic representation of the effect of contour data. Within image 96 is contained a pixel 98. Defining pixel 98 to be of uniform color would produce a medium resolution image. This is often done as contone data for areas of high uniform color in an image. However, to obtain very high resolution, such as for the clearly defined edge of objects of radically different colors, the pixel must not be uniform. In the present example, line 100 separates pixel 98 into two areas. The first of these has a composite color 102 and the second has a composite color 104. Contour data is used to define this condition.

Figure 5:
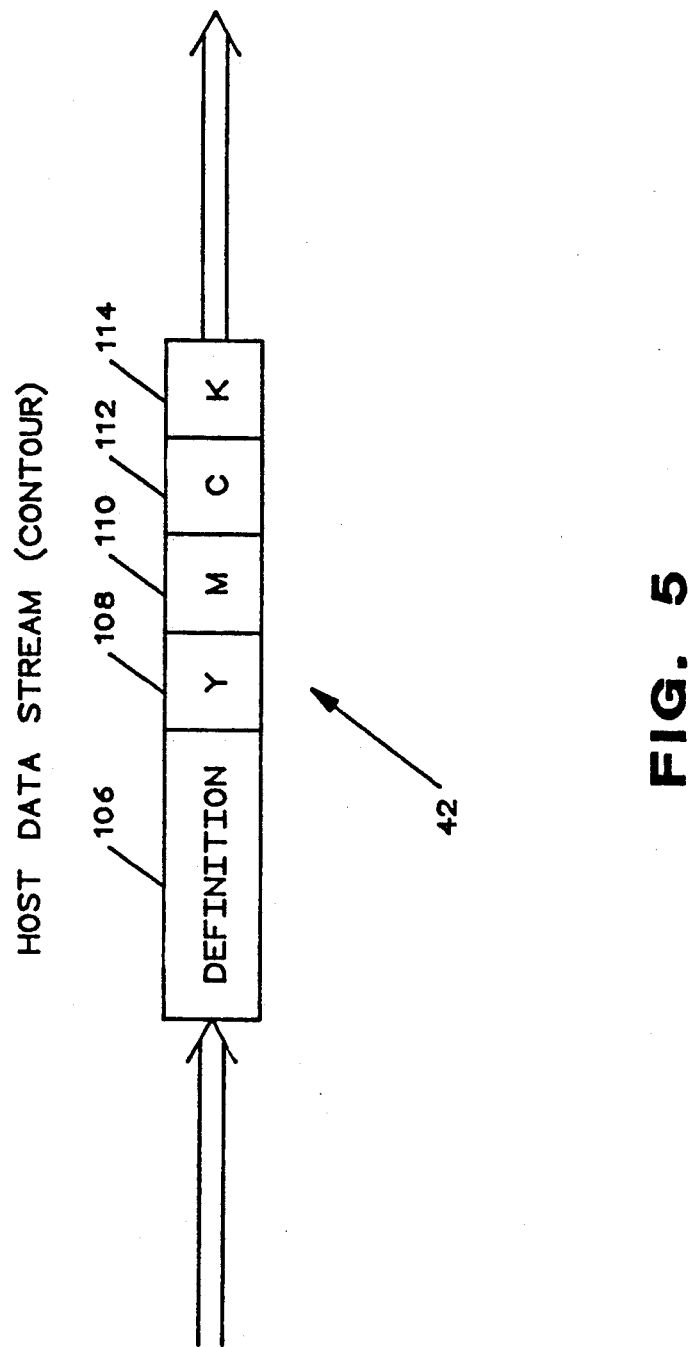
FIG. 5 is a schematic representation of contour data.

FIG. 5 is a schematic representation of contour data as transmitted from data source 12 to data processor 14 via cable 42. As with contone data, contour data has a byte Y 108 which defines the yellow component. M 110 defines the magenta component. C 112 and K 114 define the cyan and black (monochrome) components, respectively. However, contour data requires definition field 106 which defines the position within a pixel for which the fields Y 108, M 110, C 112, and K 114 are true. The positions where they are not true are defined by a second set of values for Y, M, C and K. This distinguishes from contone data wherein the four defined color bytes are true for the entire pixel. Typically a pixel is divided into regions, each with its own value of Y, M, C. and K (see also FIG. 4).

Figure 6:
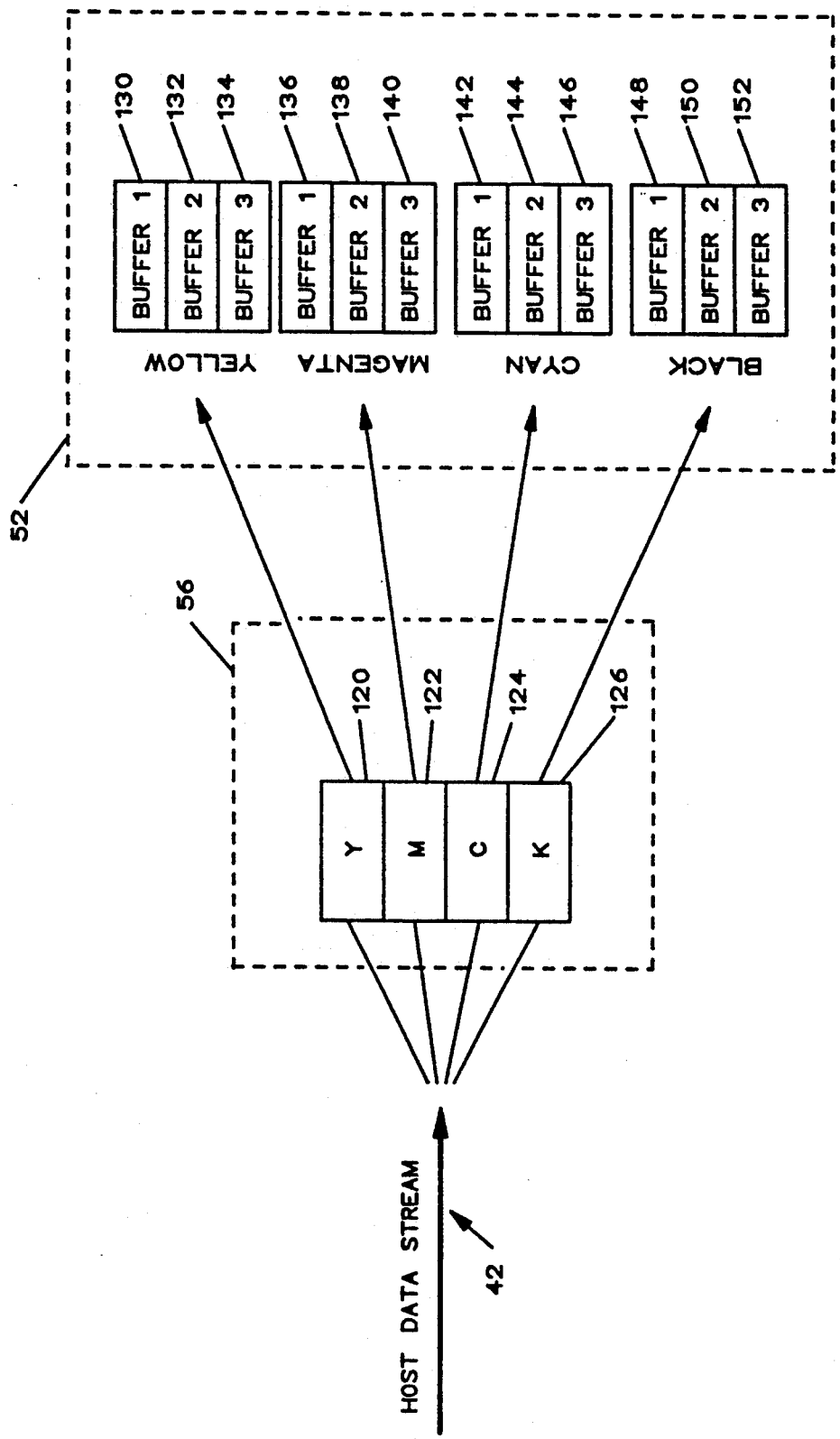
FIG. 6 is a schematic diagram showing receipt and initial storage of host data.

FIG. 6 is a schematic diagram showing receipt via cable 42 of data from data source 12 by data processor 14. In the example, contone data is received, although the other formats also must be reformatted. In this example, the data received is pixel interleaved by color as explained above. For scan line interleaved color separation, the data is separated by color in the same fashion. The colors remain separated in memory 56 which buffers the data for storage to disk drive 52. The yellow byte is stored at Y 120 of memory 56. The magneta byte is stored at M 122. Similarly, the cyan and monochrome bytes are stored at C 124 and K 126, respectively. When the four buffers contained in memory 56 are filled, they are each transferred to disk drive 52 and appended to four files, one for each color. Multiple buffers (not shown) are established in memory 56 to permit receiving of data from data source 12 and writing of data to disk drive 52 to occur in parallel.

Color separation of the data during input occurs for contone data because only one color separation is output at a time. In order to process the contone data at the maximum speed, image data values of the same color must reside sequentially on the disk. Otherwise, 3 out of every 4 pixels retrieved from storage must be discarded before processing, thereby reducing inherent data rates by a factor of 4.

In this manner, multiple image files are received from the source, reformatted into one or more files as necessary according to their format, and stored on disk. Multiple buffers are mapped onto disk drive 52 to provide a separate storage file for each of the four contone color separations as well as for each of the other common data formats (contour and run-length).

Each of the files of disk drive 52 are multiply buffered in memory 56 during its creation as explained above to permit receiving data from the host to occur in parallel with writing the file to the disk for real time operation. Also, during the creation of the disk files, a separate low resolution file is created to enable an operator to preview the image data on a video terminal before being output to the recorder. This low resolution image may be entered into a database for easy access at a later time after the image data has been archived.

Figure 7:
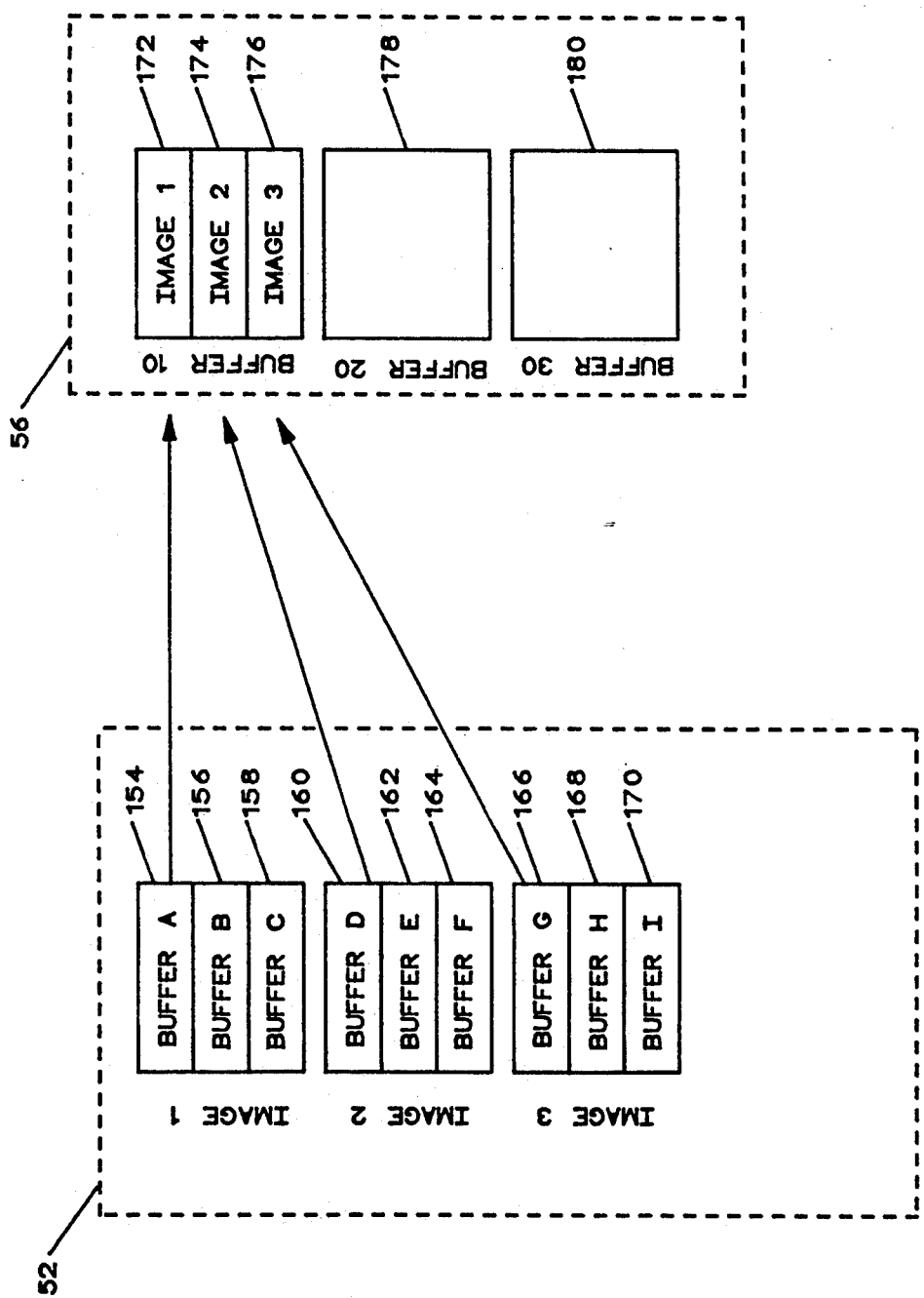
FIG. 7 is a schematic diagram showing retrieval of stored image data.

FIG. 7 is a schematic representation of how multiple image files are retrieved in parallel from disk drive 52 for processing and transfer to the output device. In this example, three separate image files are to be combined into a single composite. Buffer A 154, buffer B 156, and buffer C 158 contain the color separated contone data for Image 1.

Image 2 is represented by buffer D 160, buffer E 162, and buffer F 164 for storage of contone data. Buffer G 166, buffer H 168, and buffer I 170 store the contone data for Image 3.

Shown in the drawing is the transfer of one buffer of the contone data from buffer A 154, buffer D 160, and buffer G 166 to buffer 10 of system memory 56. Notice the image system 10 remains segmented into Image 1 172, Image 2 174, and Image 3 176 files. However, buffer 10 of memory 56 contains all of the contone data required to produce several scan lines of the composite.

The map file determines the size of each of the buffers A-I. The map file determines buffer size based on the available buffer space in memory 56, the memory buffer size of Contone DSP (digital signal processor) 62, and the size and location of each image to be combined on the composite page. As many sequential buffers of each image file are read at a time and separated in memory as possible since this optimizes the efficiency of the disk drive.

Figure 8:
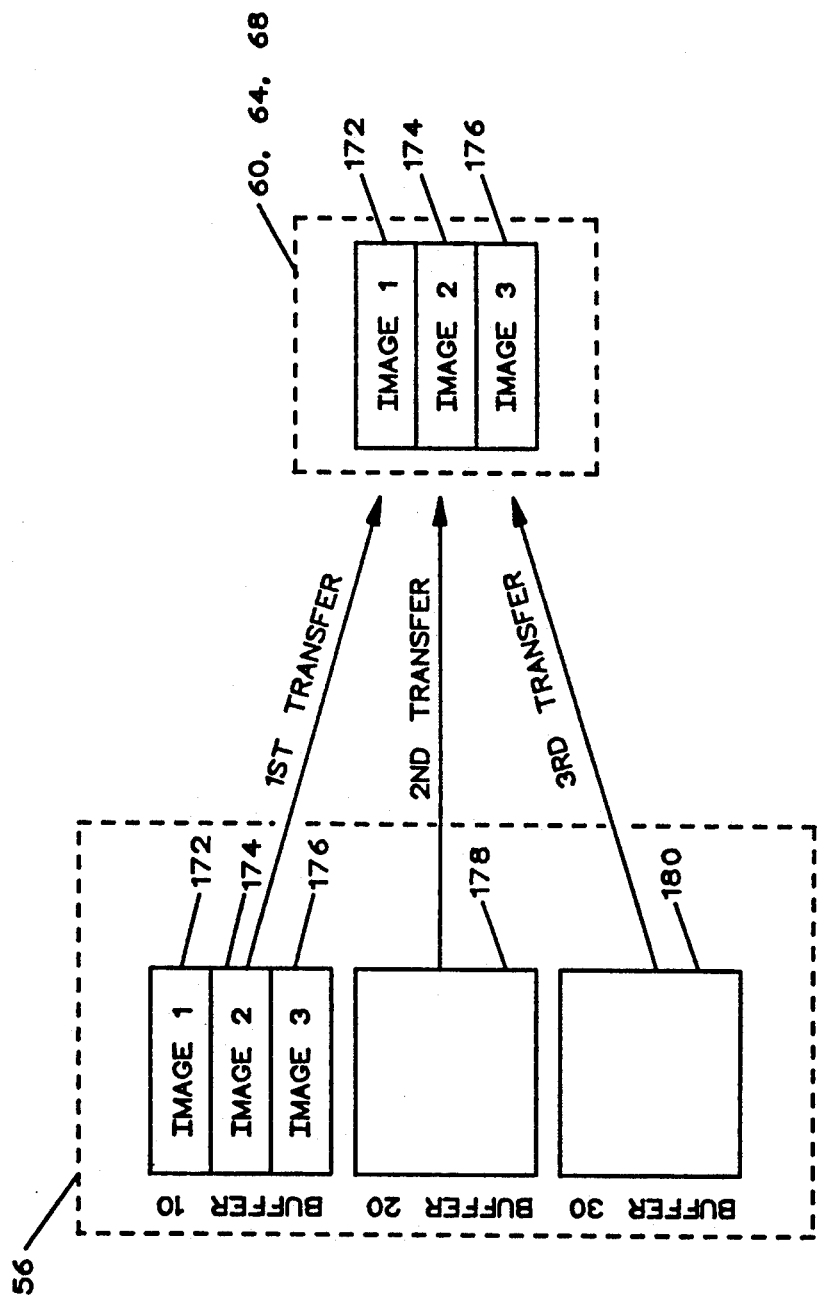
FIG. 8 is a schematic diagram showing transfer of image data to the special purpose conversion hardware.

FIG. 8 is a schematic diagram showing the transfer of data between memory 56 and the contone memory 60 associated with the special purpose conversion hardware. Buffer 10 contains the first group of segments pertaining to contone data only. It transfers the image data to memory 60 which functions as a buffer for contone DSP 62. Buffer 20 178 contains the second group of segments which are transferred to contone DSP 62 in response to a VME bus interrupt indicating the contone DSP has finished processing the first group of segments. Buffer 30 180 contains the third group of segments which are transferred to contone DSP 62 in response to a VME bus interrupt indicating the contone DSP has finished the second group of segments. The transfers are shown relative to Image 1 172, Image 2 174, and Image 3 176. The transfers are accomplished by the central processing unit 54 coupled to memory 56 in response to VME bus interrupts (i.e. a READY signal) generated by the contone DSP hardware.

The interaction of the central processing unit with the contour and run-length DSP hardware is identical to that described for contone data and occurs in parallel with transfers of contone data by means of the multitasking software environment described in more detail below.

Figure 9:
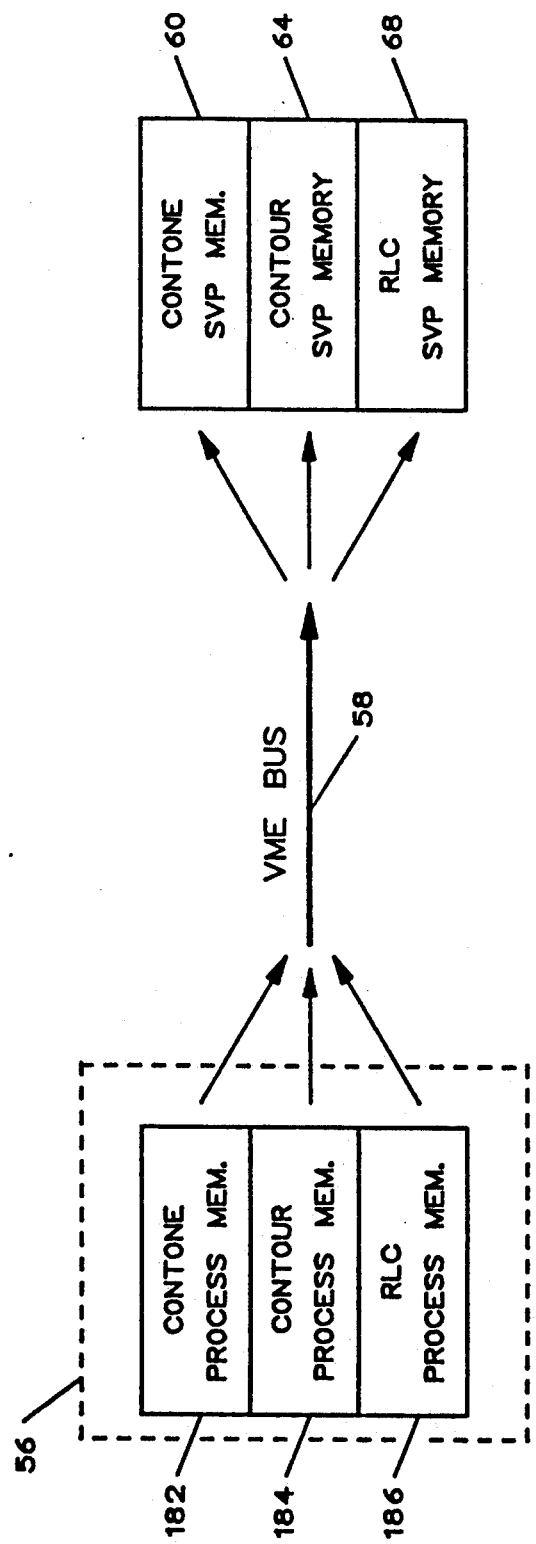
FIG. 9 is a schematic diagram showing preparation of the composite by different data types.

FIG. 9 is a schematic diagram of the data transfers discussed above. Contone data is taken from contone process memory buffer 182 of memory 56 and transferred at the proper time over internal VME bus 58 to contone svp memory 60. Similarly, the contents of contour process memory buffer 184 and run-length process memory buffer 186 of memory 56 are transferred at the proper times over internal VME bus 58 to contour svp memory 64 and run-length svp memory 68, respectively. The transfers of these three data formats occur in parallel by means of the multitasking software environment chosen for the system.

Figure 10:
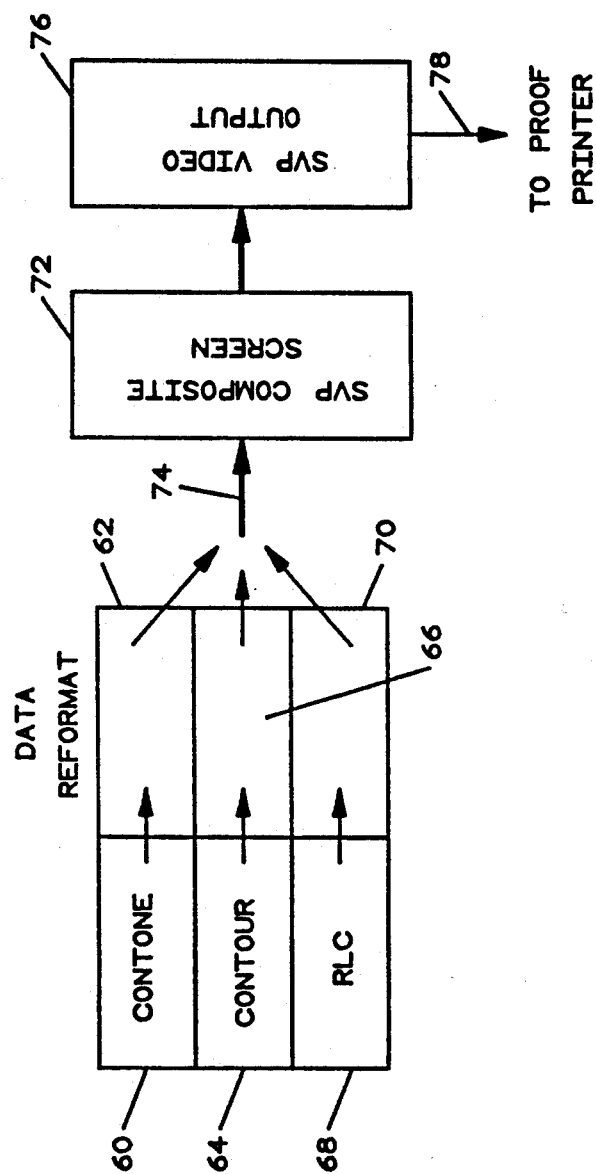
FIG. 10 is a schematic diagram showing the combining of the halftone pixel data in scan line format.

FIG. 10 is a schematic diagram of the conversion of the data into video for use by the proof recorder. Each scan line of data received by contone memory 60 is converted to high resolution pixel data by contone DSP 62 and placed on image bus 74 for transfer to the screening hardware. Similarly, contour data is received at contour memory 64 and converted to high resolution pixel data by contour DSP 66. Run-length data sent to run-length memory 68 is converted to high resolution pixel data by run-length DSP 68 and transferred to the screening hardware 72 over image bus 74 in the form of bytes.

The screening hardware 72 converts the high resolution pixel data received on image bus 74 into a high resolution halftone pixel data stream. As explained above, the conversion may be performed using special purpose hardware components similar to what is practiced in the art.

This halftone pixel data stream is then transferred in a parallel format to the video output hardware which converts the parallel halftone data into serial pixel data output which indicates on-off commands to the laser beam(s) of the printer. The high resolution pixel data is transferred to the output device via high speed interface 78.

Whenever the three formats of image data are superimposed at the same location on the composite image, the video output hardware determines which of the three DSP hardware are permitted to output their high resolution pixel data to the image bus for transfer to the screening hardware. This gating of the data from the DSP boards is based on a predetermined relative priority installed in the video output hardware. Furthermore, if any of the pixel data entering a DSP has a coded value which is designated as transparent, the DSP does not endeavor to transfer that data in its high resolution form to the image bus.

Figure 11:
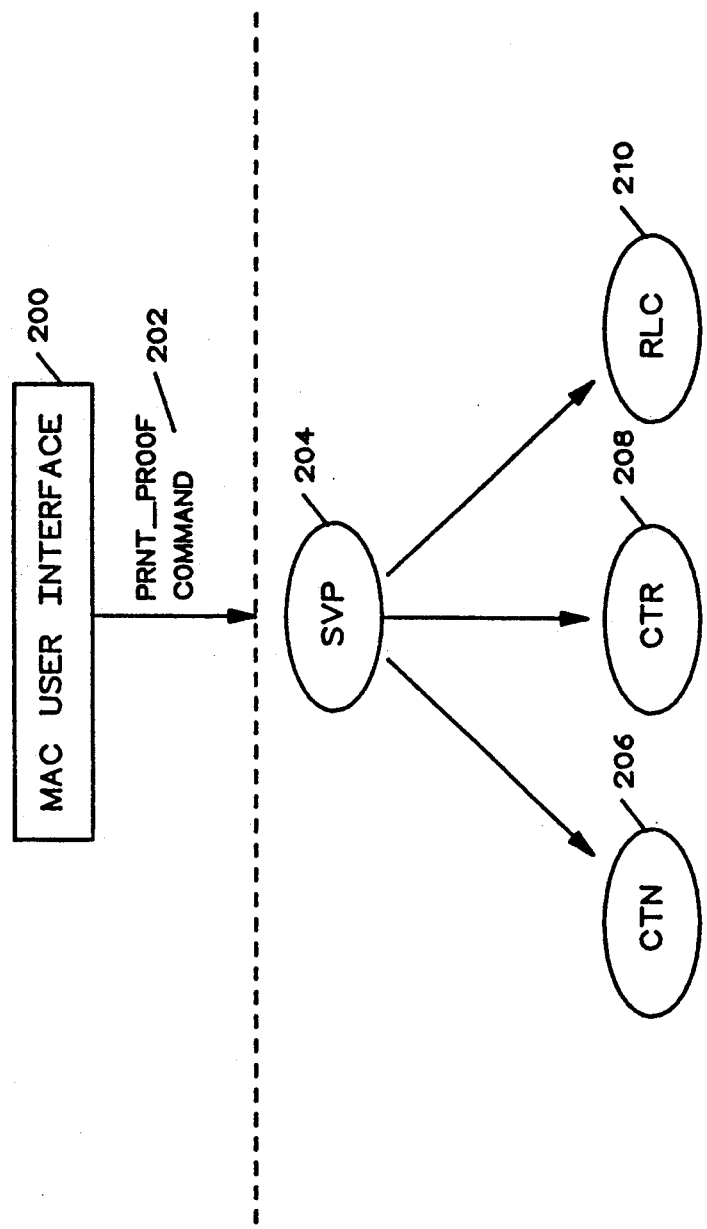
FIG. 11 is a schematic diagram of the overall software architecture.

FIG. 11 is an overall flowchart for the software which controls central processing unit 54. The system is controlled by an off-the-shelf Macintosh computer available from Apple Computer Co. The standard user interface via a keyboard/mouse and video screen are used. This system combination is simply referred to as Mac User Interface 200. A print proof command (i.e. PRNT_PROOF 202) is issued to central processing unit 54 through executive procedure SVP 204. The executive procedure SVP 204 then activates the contone process, CTN 206, the contour process, CTR 208, and the run-length process, RLC 210. Because these procedures operate in a multi-tasking environment, each runs on central processing unit 54 only as necessary.

Figure 12:
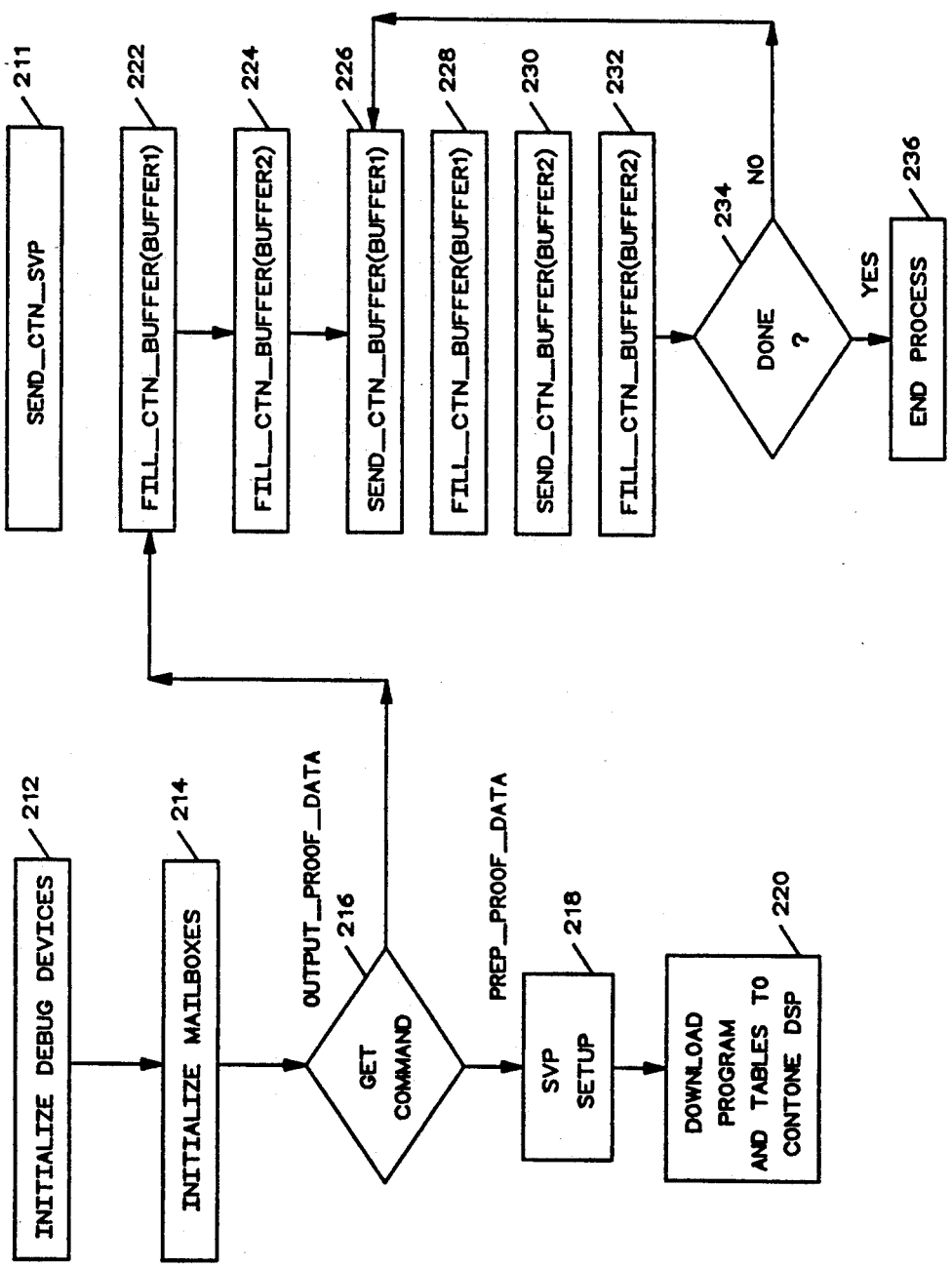
FIG. 12 is a flowchart of the software used for contone processing.

FIG. 12 is a flowchart showing the contone data processing. The contone data processor is shown by way of example with the other two data types (i.e. contour and run-length) processed in a similar fashion. The procedure is initialized at element 212 and the mailboxes are initialized at element 214.

Element 216 fetches the command from the user interface (see also FIG. 11) and branches depending upon the nature of the command. When the command is PREP_PROOF_DATA, element 218 performs the setup of the scan-line video processor hardware. Element 220 then downloads the program and data tables for the contone digital signal processor hardware.

Whenever element 216 detects an OUTPUT_PROOF_DATA command, element 216 transfers control to element 222 to fill the contone buffer (i.e. buffer 1). As additional data comes in, element 224 switches to contone buffer 2. Element 226 outputs contone buffer 1 first. When contone buffer 1 is completely empty, element 228 begins to fill it again. In the interim, element 230 initiates transfer of contone buffer 2. When contone buffer 2 is empty, it is refilled by element 232.

The process continues until element 234 determines that all of the required data has been transferred. If not, control returns to element 226. If all of the data has been transferred, the process ends at element 236.

Figure 13:
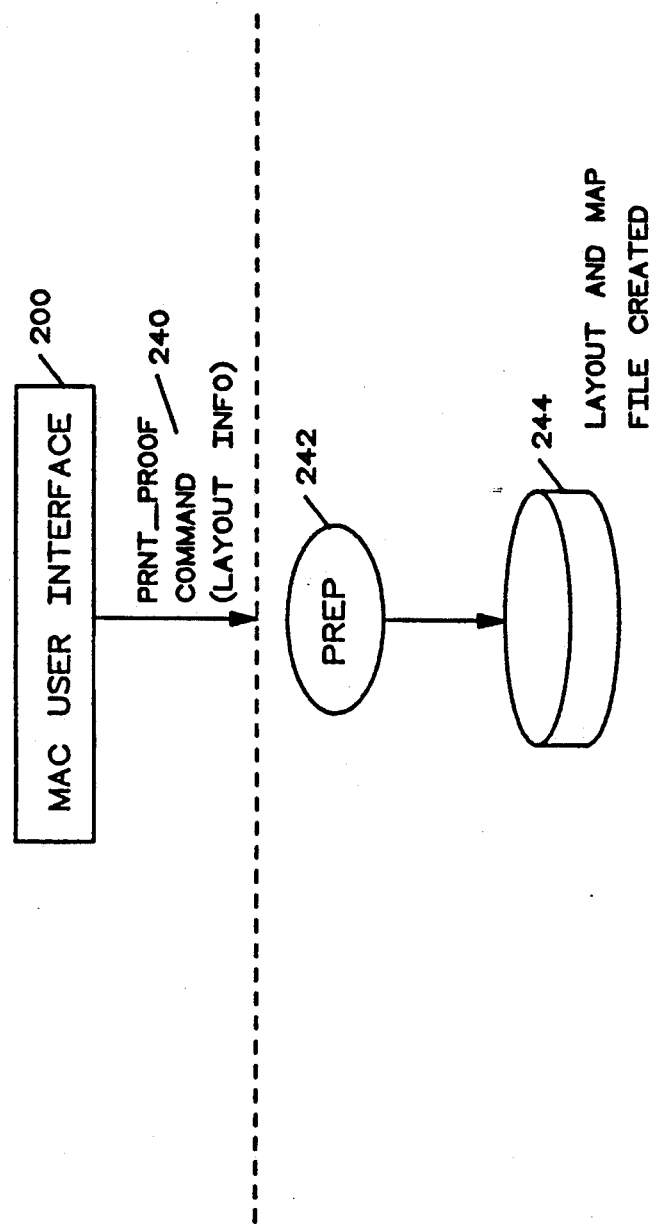
FIG. 13 is a schematic diagram of the mapping process.

FIG. 13 shows the way in which multiple images are integrated into a single composite using a map. The procedure which is called within central processing unit 54 is PREP 242. This procedure produces the map file 244 which is used for real time switching of the data at the time of composite data assembly and output during the proof printing process.

Figure 14:
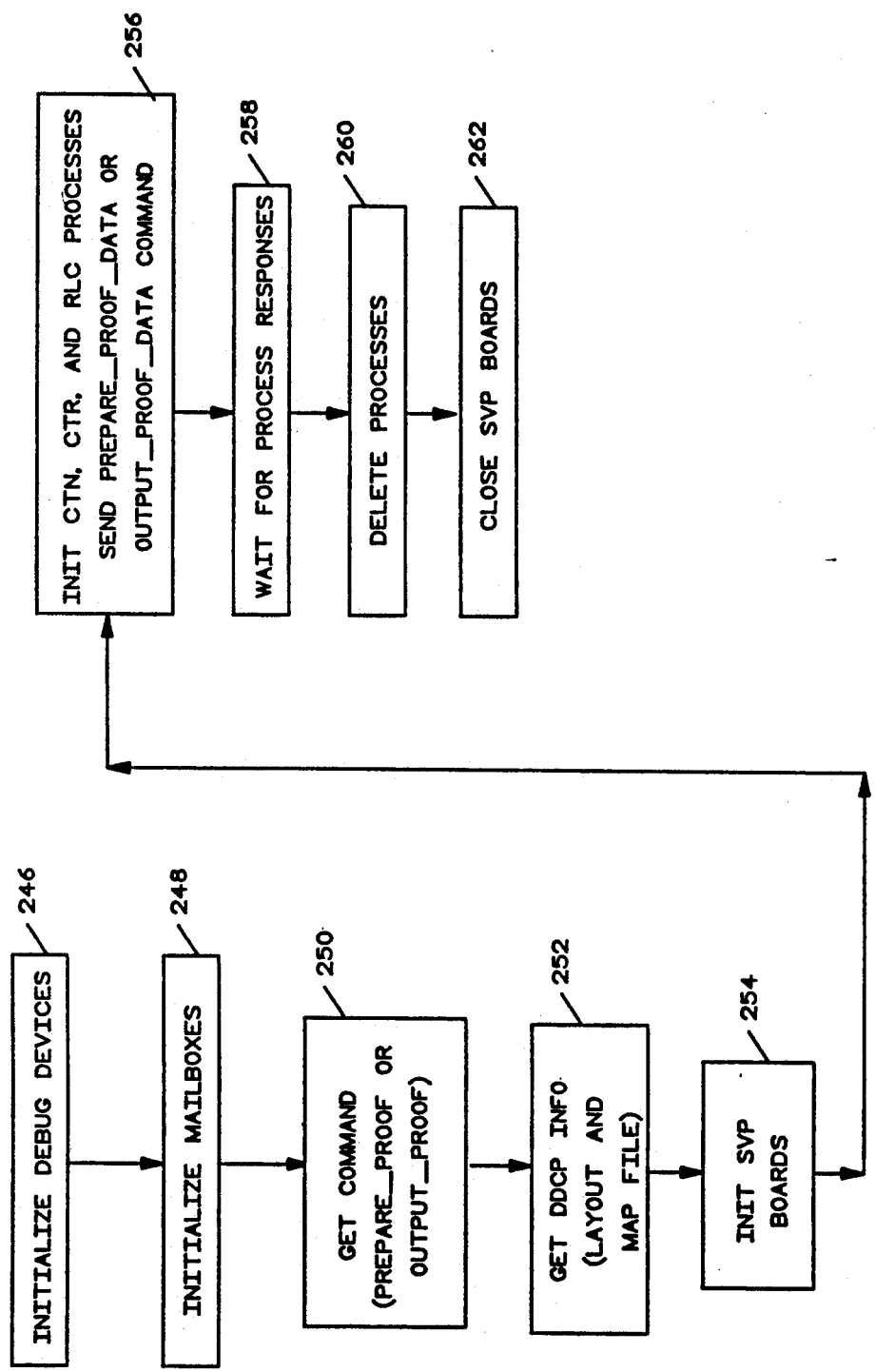
FIG. 14 is a flowchart of the software which outputs the data for conversion into halftone pixel data.

FIG. 14 is a more detailed flowchart of the software which initializes the switching for preparation of a composite proof. Element 246 initializes the debug devices and element 248 initializes the mailboxes. The command (see also FIG. 13) is processed at element 250.

The scan line video processor hardware is initialized by element 254. The contone, contour and run-length processes are initialized by element 256. Element 258 awaits responses. As explained above, the various tasks of central processing unit 54 are interrupt driven permitting the system to operate in a multi-tasking mode in which the central processing unit 54 attends to a particular procedure only when necessary. This feature is required for practical real time operation.

Unnecessary processes are deleted at element 260 when they become superfluous. Similarly, the scan line video hardware is secured at element 262 when not needed.

Having thus described the preferred embodiments of the present invention, those of skill in the art will be readily able to apply the teachings found herein to other embodiments within the scope of the claims hereto attached.

What is claimed is:

1. A method for combining in real time a plurality of image data files of differing sizes, resolutions, and formats and for real time converting of said data into halftone pixel data for output on either single or multiple beam recording devices comprising:

receiving said plurality of image data files from a source;

reformatting each of said image data files as they are received into one of several possible formats, each format being determined by the original format of said image data file in conjunction with an image data conversion means, said reformatting being performed in real time while said data is being received at the maximum data rate of said source and which may include separating said image data file into multiple image data files according to color separation;

storing said reformatted data files, said storing being performed in real time while said data is being received at the maximum data rate of the source;

preparing a data map file to specify which portions of said plurality of different image files are to be retrieved from storage when the conversion from image data to halftone pixel data takes place, based on position coordinates for each image determined by an operator, in which said map file is optimized to permit maximum data retrieval rate from said storage;

retrieving and transferring said reformatted image data files according to said map file in which portions of variable size from each file are retrieved and placed in at least one data buffer of image data conversion means via high speed interface in response to a ready signal from said image data conversion means, said retrieval and transfer of data occurring iteratively until all image files have been converted;

converting in parallel said plurality of data types each of which may contain certain of said plurality of image data file portions into one output stream of high resolution halftone pixels via image data conversion means, said converting occurring in real time while said retrieval and transferring of reformatted image data files is being performed and in response to a ready signal transmitted from an output recording device; and, transmitting said high resolution halftone pixels also in response to said ready signal transmitted from said output recording device.

2. A method according to claim 1 further comprising assembling a preview file of lower resolution from each of said plurality of image data files, said assembling being performed in real time while said data is being received at the maximum data rate of said source.

3. An apparatus comprising:

means for receiving a plurality of image data files representing a plurality of images in a plurality of data formats;

means coupled to said receiving means for processing said plurality of image data files to produce image data files of new format, the new format being dependant on the original image data format of each image file in conjunction with the required format for an image data conversion means, said processing capable of being performed in real time while said data is being received at the maximum data rate of the source and which may involve separating a particular image data file into a plurality of files according to color separation;

means coupled to said processing means for storage of said reformatted image data files, said storage capable of being performed in real time while said data is being received at the maximum data rate of the source;

means coupled to said processing means for receiving portions of said plurality of reformatted image data files retrieved from storage by said processing means and for converting in parallel said plurality of different image data formats each of which may contain certain of said plurality of image data file portions into a composite image in the form of a halftone pixel data stream, said converting performed in real time in response to ready signals transmitted from an image recording means; and, means coupled to said converting means for transmitting said halftone pixel data stream to said image recording means in response to ready signals transmitted from an image recording means.

* * * * *